Sept. 12, 1944. W. G. WEHR 2,358,116
ELECTRICAL DISTRIBUTION SYSTEM
Filed Sept. 20, 1939 3 Sheets-Sheet 1
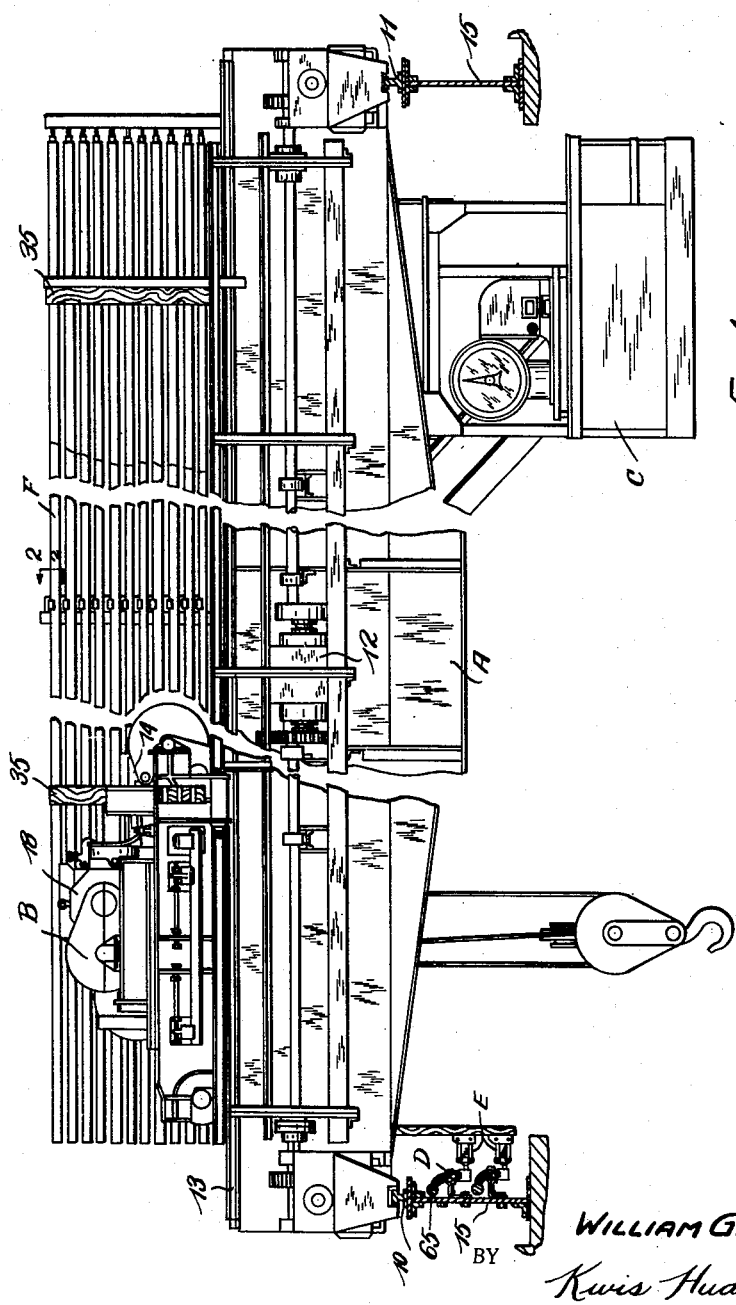
INVENTOR.
WILLIAM G. WEHR
BY
Kwis Hudson & Kent
ATTORNEYS

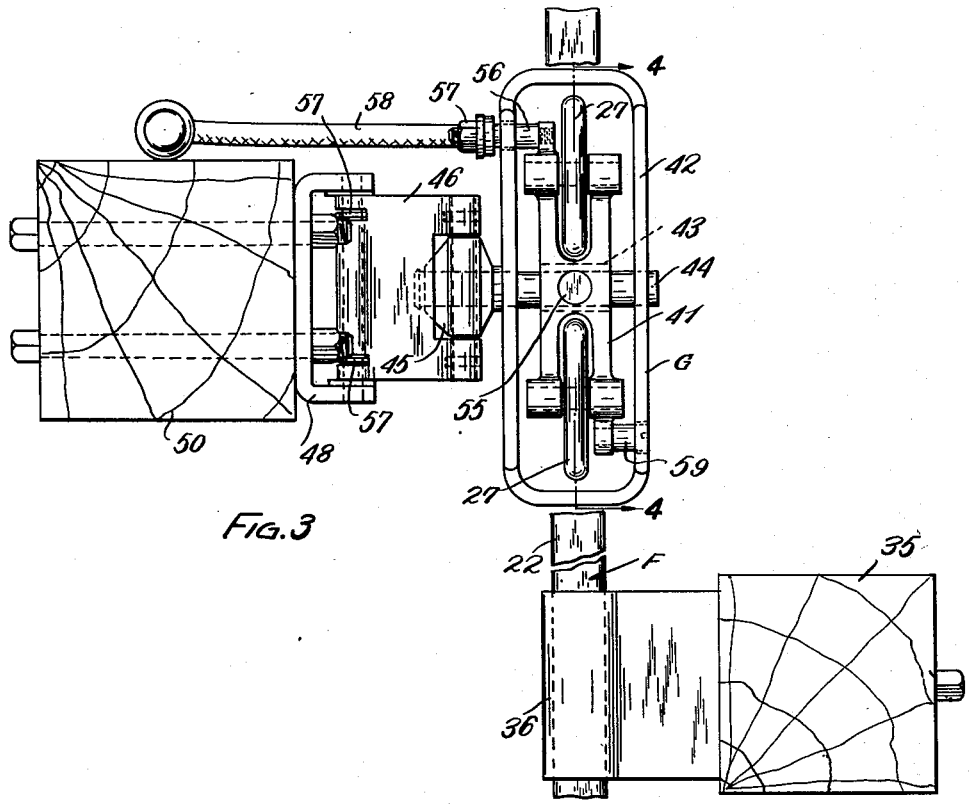

Sept. 12, 1944. W. G. WEHR 2,358,116
ELECTRICAL DISTRIBUTION SYSTEM
Filed Sept. 20, 1939 3 Sheets-Sheet 3

INVENTOR.
WILLIAM G. WEHR
BY
Kwis Hudson & Kent
ATTORNEYS

Patented Sept. 12, 1944

2,358,116

UNITED STATES PATENT OFFICE 2,358,116

ELECTRICAL DISTRIBUTION SYSTEM

William G. Wehr, East Cleveland, Ohio, assignor to The Cleveland Crane & Engineering Company, Wickliffe, Ohio, a corporation of Ohio Application September 20, 1939, Serial No. 295,802

5 Claims. (Cl. 191—23)

The present invention relates to electrical distribution systems, and more particularly to electrical distribution systems for cranes, especially traveling cranes.

An object of the invention is the provision of a novel electrical distribution system for cranes and the like so constructed and arranged that it is practically impossible for workmen, etc., to accidentally come in contact with energized conductors or parts thereof.

Another object of the invention is the provision of a novel electrical distribution system of the character referred to, which is simple in construction, reliable in operation, and easy to install.

The invention resides in certain details of construction and combinations and arrangements of parts and further objects and advantages thereof will be apparent to those skilled in the art to which the invention relates from the following description thereof described with reference to the accompanying drawings forming a part of this specification in which similar reference characters designate corresponding parts, and in which:

Fig. 1 is a side elevational view, with portions broken away, of a traveling crane embodying the present invention;

Fig. 2 is a sectional view on the line 2—2 of Fig. 1;

Fig. 3 is a plan view of the mechanism shown in Fig. 2;

Fig. 4 is a sectional view with the wheels omitted on the line 4—4 of Fig. 3;

Figure 5:
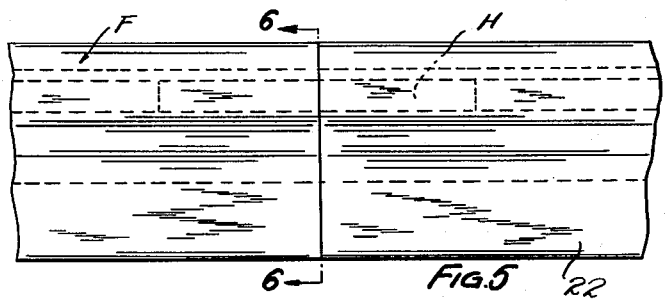
Fig. 5 is an enlarged side elevational view of one of the conductors showing the manner in which two sections of conductor bar are connected together.
Figure 6:
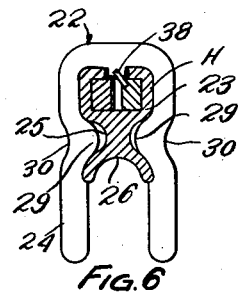
Fig. 6 is a sectional view on the line 6—6 of Fig. 5.
Figure 7:
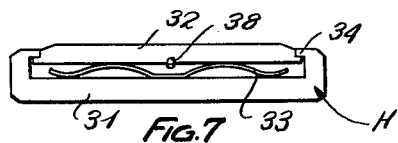
Fig. 7 is a plan view of the connector shown in Fig. 5.
Figure 8:
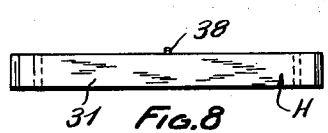
Fig. 8 is a side elevational view of the connector shown in Fig. 7.

While the invention is susceptible of various modifications and alternative constructions, it is herein shown and described as embodied in a traveling crane of the type ordinarily employed in buildings for moving heavy objects from place to place. Referring to the drawings, Fig. 1 shows a traveling crane similar to that disclosed in United States Patent No. 2,142,579 issued January 3, 1939, except for the electrical distribution system which has been modified to embody the present invention. Only those parts of the crane which are necessary to a complete understanding of the present invention are herein shown and described in detail. For a more complete description of the crane, reference is made to the above-mentioned patent.

The crane shown comprises a bridge A supported upon a plurality of rails 10 and 11 and adapted to be traveled therealong by a reversible electric motor 12, commonly referred to as the bridge motor, and a trolley B, supported upon rails 13 carried by the bridge A, and movable longitudinally of the bridge by a reversible electric motor 14, commonly referred to as the trolley motor. The rails 10 and 11 are supported by the building within which the crane is housed, etc. in a manner well known in the art. As shown, the rails 10 and 11 are supported on structural members 15, the left-hand one of which also supports the conductors D which supply electrical current to the crane, through the medium of collector assemblies E. The trolley B also comprises suitable hoist mechanism including a reversible electric motor 18. The actuation of the electric motors 12, 14 and 18 is adapted to be controlled from a control cage C suspended from the bridge A. The electric circuits between the mechanism located on the trolley B and in the control cage C are completed through the medium of trolley conductors F, of which there are twenty-two employed in the preferred embodiment of the invention shown, carried by the bridge A and collector assemblies G (see Fig. 2) carried by the trolley B. The crane thus far described is of conventional construction with the exception of the particular construction of the conductors D and F, the collector assemblies E and G, and the manner in which the conductors are supported and the connections made thereto.

According to the provisions of the present invention, the conductors D and F are made up of one or more sections or lengths of conductor bar 22 comprising a metal bar-like member 23 of uniform cross section throughout its length and enclosed within an insulating material 24 preferably made of soft rubber cemented or otherwise securely fixed to the metal bar 23 with the exception of the underside and the ends thereof. The bar 23 which is preferably made of aluminum, is generally rectangular in cross sectional shape and is provided with longitudinal grooves or depressions 25 on opposite sides thereof which, in addition to decreasing the weight of the bar, increase the radiating surface thereof, and assist in securing the insulating covering 24 thereto. The underside of the bar 23 has a substantially semi-circular groove therein which provides a large concave contact surface 26 for the collector wheels 27 of the collector assemblies G. The upper side of the bar 23 is provided with an undercut, non-circular aperture 28, the purpose of which will be hereinafter apparent. The insulating covering 24 is generally inverted, U-shape in cross section with the free ends thereof projecting a considerable distance below the bar 23, and has a plurality of inwardly projecting ridges 29 adapted to cooperate with the longitudinal grooves 25 in securing the same to the metal bar 23. As shown the insulating covering 24 is provided with a plurality of longitudinal grooves 30 exteriorly of the ridges 29, which grooves are utilized in supporting the conductors.

When a plurality of sections or lengths of conductor bar 22 are employed in making a conductor such as the conductors D or F, the abutting ends of adjacent conductor bars are preferably aligned and electrically and mechanically connected together by connectors including means adapted to extend into the longitudinal apertures in the conductor bar and be retained therein by friction. When the conductor bars have a single longitudinal aperture therein the apertures are preferably non-circular and the portions of the connector extending therein must conform at least to a portion of the non-circular apertures in the conductor bars so as to prevent relative angular movement therebetween. The conductor bars preferably have a single longitudinal aperture therein and the preferred shape of this aperture is that shown in the drawings. In the embodiment of the invention shown, a single resilient connector H wholly enclosed within the conductor bars is employed to align and mechanically and electrically connect abutting ends of adjacent conductor bars. The connector H comprises two parts 31 and 32 continuously urged apart by a leaf spring 33 interposed therebetween so that when assembled with the conductor bars the connector H is held in tight frictional engagement within the longitudinal apertures of the conductor bars. When not assembled with the conductor bars the two parts 31 and 32 of the connector H are held in assembled relationship with each other by flanges 34 on the member 31 which engage over the ends of the member 32. The resilient connector H is so constructed that it securely engages within the apertures of the respective conductor bars and holds the same in alignment and in fixed angular relation to each other. Provision may be made to assure half of the connector H being enclosed within each of the adjacent conductor bars 22 in the form of a small pin 38 fixed to the upper side of the member 32 of the connector H and adapted to project outwardly into the groove 28 and embed itself between the ends of insulating material 24 when the conductor is assembled.

In the embodiment of the invention shown, the conductors F are carried by vertical members 35 formed of wood or other suitable insulating material fixed to the bridge A of the crane to which wooden members the conductors are secured by metal members 36 bolted to the wooden members 35 by means of bolts 37. The free ends of the members 36 are so formed that they engage around the upper part of the conductor bar and hold the same by friction, leaving the lower side of the conductor bar open. The construction is such that the electrically energized bars 23 of the trolley conductors are insulated from each other and from ground at two separate places. In the first place the bars 23 are insulated from the supporting members or brackets 36 by the insulating covering 24 on said bars and in the second place the members or brackets 36 are insulated from each other and from the bridge proper by the members 35 which are also made of insulating material. This is an important safety feature since the insulation between the metal bar 23 and the member 36 can fail without causing serious damage, etc.

The collector assemblies G comprise a plurality of aligned wheels 27 fixed to short shafts 40 rotatably supported in a metal bracket member 41 within a housing 42 made of insulating material. The housing 42 is provided with a bushing 43 intermediate the axes of the wheels 27 through the medium of which bushing it is rotatably and slidably supported on a tubular shaft 44, one end of which is fixed in a member 45 carried by a plurality of links 46 pivoted to opposite ends thereof by pins 47 and to a bracket 48 by pins 49. The bracket 48 is bolted to a vertical upright 50 made of insulating material and carried by the trolley B. The tubular shaft 44 is continuously urged in an upward direction to engage the collector wheels 27 with the concave contact surface 26 of the metal bar 23 by tension springs 51, the lower ends of which are connected to the lower pin 47 while the upper ends thereof are connected to the upper pin 49. The construction is such that as the shaft 44 moves vertically due to irregularities in the conductor bar, etc., the axis thereof always lies in parallel planes. Referring to the particular construction shown, the axis of the shaft 44 always lies horizontally.

The wheels 27 are adapted to engage the concave contact surface 26 of the conductor and travel therealong. The axis of the tubular shaft 44 is at right angles to the length of the conductor and the fact that the housing 42 is pivoted thereto intermediate the axes of the wheels 27 allows the latter to readily engage the contact surface 26 of the conductor at all times. The bracket member 41 is pivoted for limited movement about a vertical axis within the housing 42 on a vertical pivot 55 directly above the bushing 43. The electrical connection is made with the bracket 41 and in turn the wheels 27 by a terminal post 56 secured to one end of the bracket 41 and provided with a nut 57 for the attachment of a lead or line 58. The terminal post 56 projects through a suitable aperture in the housing 42. The opposite end of the bracket 41 has a screw 59 fixed therto which projects through a similar aperture in the housing 42. The apertures through which the terminal post 56 and the screw 59 project are slightly larger than the respective members. This permits limited movement of the bracket 41 within the housing 42. Opposite sids of the housing 42 are provided with upwardly extending flanges 60 which project well above the lower ends of the insulating covering 24 of the conductor bar, thus making it very difficult, if not impossible, for one to come in contact with the energized members of the collector assembly. Preferably the exposed parts of the terminal post 56, including the nut 57, are enclosed within a protective non-conducting material. This is most conveniently accomplished by taping the members referred to.

Figure 9:
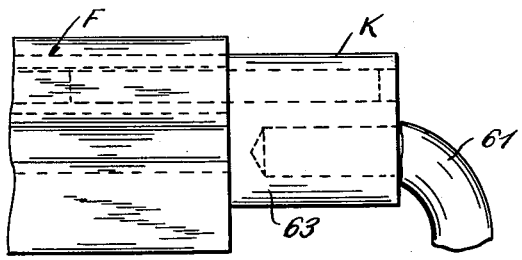
Fig. 9 is a side elevational view of the right-hand end of one of the conductors of Fig. 1 showing an end conductor terminal.
Figure 10:
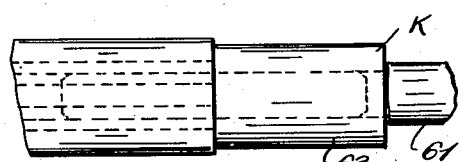
Fig. 10 is a plan view of Fig. 9.
Figure 11:
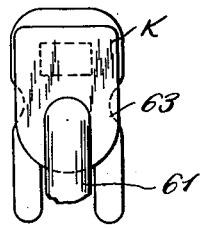
Fig. 11 is an end view of Fig. 9, looking from the right.

The electrical connections are preferably made to the conductors F at the ends thereof. As shown in Figs. 9, 10 and 11 the lead 61 which it is desired to connect to the conductors F is provided with an end terminal K comprising metallic members 63. The members 63 are provided with apertures opening into the left-hand end thereof similar to the aperture in the conductor bar and within which one end of a connector H is adapted to be received and form the electrical and mechanical connections between the members. The terminal K is preferably well taped so as to prevent contact with the metal portion thereof. The tape has not been applied in the drawings.

Figure 12:
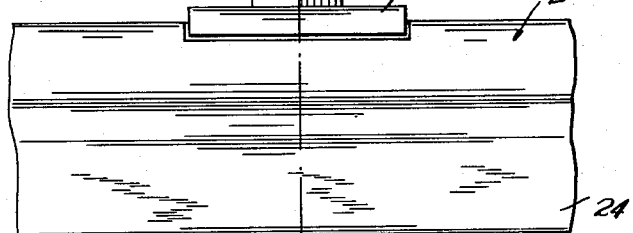
Fig. 12 is a side elevational view of one of the conductors of Fig. 1 showing a midway conductor terminal.
Figure 13:
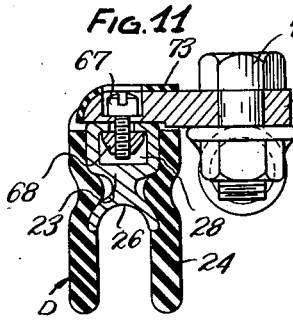
Fig. 13 is a sectional view on the line 13—13 of Fig. 12.
Figure 14:
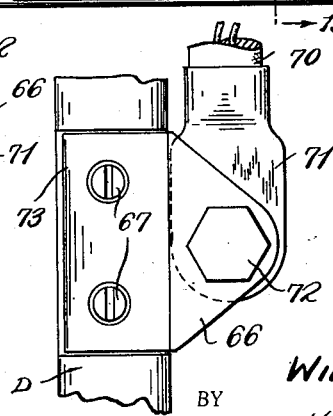
Fig. 14 is a plan view of the mechanism shown in Fig. 12.

In some instances it is desired to have a terminal midway of the conductor. This is particularly true in the case of the main power conductors D when the crane runways are of considerable length. In this event it is desirable to connect the conductors D intermediate the ends to feeder cables 65 supported thereabove. Figs. 12, 13 and 14 shows a preferred form of midway conductor terminal. As shown in these figures, the upper surface of the metal member 23 of the conductor is exposed by removing a part of the insulating covering and the electrical connection is made thereto by a member 66 secured thereto by a plurality of screws 67 which have threaded engagement with a member 68 located within the undercut aperture 28 in the member 23, which member 68 engages underneath the flanges formed by the undercut groove 28. The lead 70 which it is desired to connect to the conductor is secured to the member 66 through the medium of a member 71 to which the lead is soldered and a bolt 72 of conventional construction. As shown the outer end only of the member 66 is provided with an insulating covering 73 but preferably the entire member, including the parts 70 and 72, are insulated by taping.

According to the preferred embodiment, the conductor bars have a single longitudinal non-circular aperture therein. It is to be understood, however, that a plurality of apertures may be employed in which event abutting ends of adjacent bars are connected by a plurality of resilient connectors or by a single connector having a plurality of projections on both ends thereof. In the event that the connector or connectors employed in securing abutting ends of conductor bars together are not wholly enclosed within the apertures in the conductor bars the connectors are preferably so constructed and arranged that the contact surfaces 26 of the conductor bars abut each other thus maintaining the number of joints at a minimum.

Although the electrical distribution system of the present invention has been illustrated as applied to an overhead crane it is to be understood that it may be otherwise employed and is well adapted for use with an electrified monorail system. The fact that the edges of the metallic bar 23 of the conductor above and below the grooves 25 lie in the same plane makes it particularly easy to bend the conductor bar at the time of installation to conform to the curvature of the monorail. Where it is intended that the conductor bar will be bent, the covering 24 is made of soft rubber or some similar material. However, this is the preferred construction in any event. The conductor bars may be shipped to the point of installation in any convenient lengths and when cut to any size are just as readily assemblable as they were prior to being cut. No special tools or no special fixtures are necessary apart from the connectors H. The conductor bars are preferably supported in the position shown in the drawings, in which event the contact surfaces 26 are free from dust and/or ice. If the insulating covering 24 is made of flexible rubber, any ice which might form on the lower ends thereof will be readily broken off by the collector wheels, etc.

Earlier in the specification attention was called to the fact that the electrically energized parts of the trolley conductors were insulated from each other and from the bridge A at two different points. This is also true of the energized parts of the collector assemblies, which parts are insulated from each other and from the trolley B by the housings 42 and the member 50, both of which parts are made of suitable insulating material.

From the foregoing it will be apparent that the objects of the invention heretofore enumerated have been accomplished and that there has been provided a simple reliable electrical distribution system of the character referred to which can be readily constructed and erected either in the factory where the equipment is manufactured or at the place where it is to be employed. The conductor bars, connectors, conductors, and terminals, etc., disclosed herein are claimed in my copending application, Serial No. 482,137, which application is a division of the present application.

While the preferred embodiment of the invention has been described with considerable detail, I do not wish to be limited to the particular construction shown which may be varied within the scope of this invention.

Having thus described my invention, I claim:

1. A current collector assembly for an electrical distribution system, said current collector comprising a housing, a plurality of wheels rotatably supported in said housing one in advance of the other and adapted to engage and travel along a trolley conductor, a shaft, means for movably supporting said shaft, means for slidably and rotatably supporting said housing on said shaft, and means for continuously urging said shaft in a direction to engage said wheels with the trolley conductor.

2. A current collector for an electrical distribution system including a trolley conductor, said current collector comprising a shaft supported on a movable member, a housing made of insulating material rotatably and slidably supported on said shaft, a plurality of wheels one in advance of the other adapted to engage and travel along the trolley conductor, means for rotatably supporting said wheels in said housing one on either side of said shaft, and means for continuously urging said shaft in a direction to engage said wheels with the trolley conductor.

3. A current collector for an electrical distribution system including a trolley conductor, said current collector comprising a shaft, means for supporting said shaft for linear movement towards and from the trolley conductor, a housing made of insulating material rotatably and slidably supported on said shaft, a plurality of wheels one in advance of the other adapted to engage and travel along the trolley conductor, means for rotatably supporting said wheels in said housing one on either side of said shaft, and means for continuously urging said shaft in a direction to engage said wheels with the trolley conductor.

4. A current collector assembly for an electrical distribution system, said current collector including an outer housing formed of insulating material, a contact member supported in said housing and projecting therefrom adapted to engage and travel along a trolley conductor comprising a metal bar having an insulating material continuously in contact with and surrounding three sides, said housing enclosing said contact member except for an aperture through which the contact member projects and comprising a portion adjacent said aperture adapted to extend outwardly along side of the trolley conductor to a point beyond the adjacent end of the insulating covering thereof.

5. An electrical distrbution system comprising a trolley conductor device and a current collector device comprising a plurality of wheels adapted to engage and travel along said trolley conductor device, said trolley conductor device comprising a metallic member having a concave contact surface enclosed within an insulating covering except for the concave surface thereof, said insulating covering being in continuous contact with said metallic member and extending beyond the same adjacent to said contact surface, said current collector device comprising a shaft, means for supporting said shaft for movement toward and from said trolley conductor device, a housing made of insulating material rotatably and slidably supported on said shaft, a plurality of wheels one in advance of the other adapted to engage and travel along the concave surface of the metallic member of the trolley conductor, said housing comprising a portion projecting outwardly along side of said wheels to a point beyond the adjacent end of the insulating covering of said trolley conductor device, means for rotatably supporting said wheels in said housing one on either side of said shaft, and means for continuously urging said wheels into engagement with said concave contact surface of said trolley conductor.

WILLIAM G. WEHR.